(12) United States Patent
Softky

(10) Patent No.: US 8,893,076 B2
(45) Date of Patent: Nov. 18, 2014

(54) CONFIGURABLE COMPUTATION MODULES

(75) Inventor: William R. Softky, Menlo Park, CA (US)

(73) Assignee: Adobe Systems Incorporated, San Jose, CA (US)

( * ) Notice: Subject to any disclaimer, the term of this patent is extended or adjusted under 35 U.S.C. 154(b) by 260 days.

(21) Appl. No.: 13/326,084

(22) Filed: Dec. 14, 2011

(65) Prior Publication Data
US 2014/0304429 A1  Oct. 9, 2014

(51) Int. Cl.
*G06F 9/44* (2006.01)

(52) U.S. Cl.
USPC ............ 717/104; 717/101; 717/106; 717/109

(58) Field of Classification Search
CPC ... G06Q 30/02; G06Q 30/00; G06Q 30/0202; G06Q 30/0204; G06Q 30/0276; G06Q 30/0277; G06Q 10/067; G06Q 30/0256; G06Q 30/0269; G06Q 30/0601; G06F 17/30696
See application file for complete search history.

(56) References Cited

U.S. PATENT DOCUMENTS

| | | | |
|---|---|---|---|
| 7,024,468 B1 | 4/2006 | Meyer et al. | |
| 7,555,658 B2 | 6/2009 | Vahid et al. | |
| 7,676,786 B2 * | 3/2010 | Shenfield et al. | 717/104 |
| 8,375,354 B2 * | 2/2013 | Shenfield et al. | 717/109 |
| 2007/0061774 A1 | 3/2007 | Chan et al. | 717/101 |
| 2007/0168962 A1 | 7/2007 | Heinke et al. | |
| 2007/0198968 A1 * | 8/2007 | Shenfield et al. | 717/104 |
| 2008/0127058 A1 * | 5/2008 | Bray | 717/106 |
| 2009/0138304 A1 * | 5/2009 | Aharoni et al. | 705/7 |
| 2010/0138809 A1 * | 6/2010 | Shenfield et al. | 717/104 |
| 2010/0153907 A1 * | 6/2010 | Hanner et al. | 717/104 |
| 2010/0287529 A1 * | 11/2010 | Costa et al. | 717/105 |
| 2011/0302551 A1 * | 12/2011 | Hummel, Jr. | 717/105 |
| 2012/0084747 A1 * | 4/2012 | Chakradhar et al. | 717/104 |

OTHER PUBLICATIONS

Magdalini Eirinaki et al.; Web Mining for Web Personalization; 2003 ACM; 27 pages; <http://dl.acm.org/citation.cfm?id=643478>.*
Gustavo Rossi et al.; Designing Personalized Web Applications; 2001 ACM; pp. 275-284; <http://dl.acm.org/citation.cfm?id=372069>.*
Natacha Güell et al.; Modeling Interactions and Navigation in Web Applications; 2000 Springer; pp. 115-127; <http://link.springer.com/chapter/10.1007/3-540-45394-6_11#page-1>.*
Ren Yanna et al.; The Design of Algorithm for Data Mining System Used for Web Service; 2011 IEEE; pp. 480-483; <http://ieeexplore.ieee.org/stamp/stamp.jsp?tp=&arnumber=6013761>.*
Dimitrios Pierrakos et al.; Web Usage Mining as a Tool for Personalization A Survey; 2003 Kluwer Academic publisher; pp. 311-372; <http://link.springer.com/article/10.1023/A:1026238916441#page-1>.*

(Continued)

*Primary Examiner* — Thuy Dao
*Assistant Examiner* — Cuong V Luu
(74) *Attorney, Agent, or Firm* — Kilpatrick Townsend & Stockton LLP

(57) ABSTRACT

Input may be received indicating selection of multiple modules from a plurality of predefined configurable computation modules and to configure the selected modules. Configuring the selected modules may include defining one or more module inputs to each selected module and may also include defining one or more connections between modules of the selected multiple modules. The selected modules may be assembled based on the respective define one or more module inputs to each selected module and the defined one or more connections between modules. The assembled selected module may enable analysis to be performed on data received at the respective one or more module inputs.

14 Claims, 10 Drawing Sheets

(56) References Cited

OTHER PUBLICATIONS

Cristo'bal Romero et al.; Data mining in course management systems Moodle case study and tutorial; 2008 Elsevier; pp. 368-384; <http://www.sciencedirect.com/science/article/pii/S0360131507000590>.*

"Binstock on Software: Perfecting OO's Small Classes and Short Methods," Blog downloaded from http://binstock.blogspot.com/2008/04/perfecting-oos-small-classes-and-short.html on Mar. 21, 2012, dated Apr. 23, 2008, 12 pages.

* cited by examiner

CONFIGURABLE COMPUTATION MODULES

BACKGROUND

Website providers often desire to collect data that describes usage and visitation patterns for their websites. For example, website providers may collect information about how a visitor navigates through their website. This data is often referred to as web analytics data. Such information can be extremely valuable in developing usage statistics for various purposes, including for example estimating server load, determining advertising rates, identifying areas of websites that are in need of redesign, providing targeted advertising, and the like.

Often times, how the web analytics data is processed is specific to the requirements of an entity using the data. For instance, one retailer may prefer to place advertisements for a segment (e.g., type of customer, such as high-end shopper, soccer mom, etc.) in one manner whereas another retailer may prefer to place advertisements for the same segment in a different manner. Or segment classifications may vary from one retailer to another. As a result, the code to implement such processing may vary widely based on the retailer's preferences. Moreover, the person formulating those preferences is typically someone who may struggle to write the program code to implement those preferences.

SUMMARY

Various embodiments of methods and apparatus for assembling configurable computation modules to analyze analytics data are described. In some embodiments, input may be received indicating a selection of multiple modules from a plurality of predefined configurable computation modules. Additional input may be received to configure the selected modules. Configuring the selected modules may include defining one or more module inputs to each selected module. Configuring the selected modules may also include defining one or more connections between modules of the selected multiple modules. The selected modules may be assembled based on the respective define one or more module inputs to each selected module and the defined one or more connections between modules. The assembled selected module may enable analysis to be performed on data received at the respective one or more module inputs.

Figure 1:
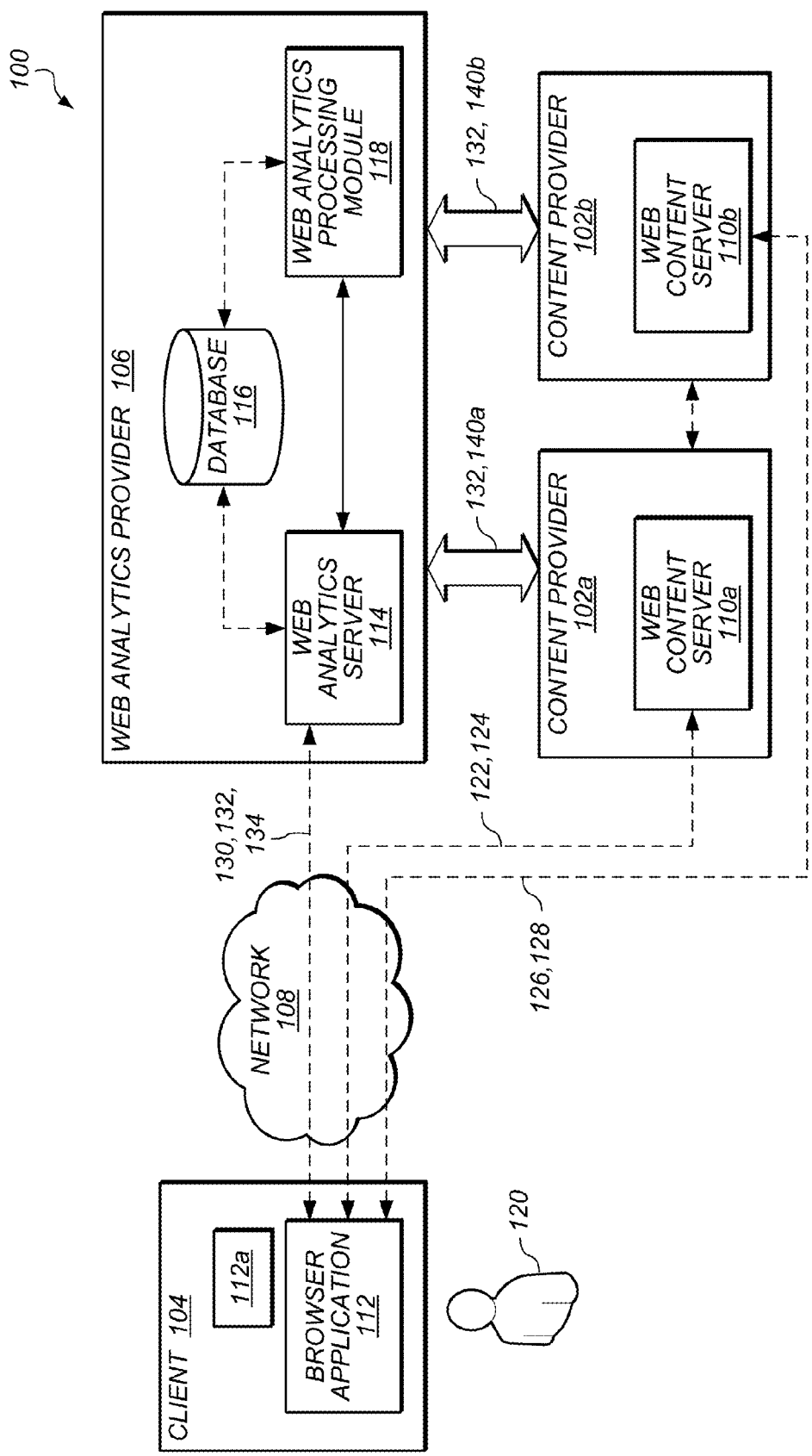
FIG. 1 as a block diagram that illustrates an exemplary network analytics system in accordance with one or more embodiments.

While the disclosure is described herein by way of example for several embodiments and illustrative drawings, those skilled in the art will recognize that the disclosure is not limited to the embodiments or drawings described. It should be understood, that the drawings and detailed description thereto are not intended to limit the disclosure to the particular form disclosed, but on the contrary, the intention is to cover all modifications, equivalents and alternatives falling within the spirit and scope of the present disclosure. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to. As used throughout this application, the singular forms "a", "an" and "the" include plural referents unless the content clearly indicates otherwise. Thus, for example, reference to "an element" includes a combination of two or more elements.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

"First," "Second," etc. As used herein, these terms are used as labels for nouns that they precede, and do not imply any type of ordering (e.g., spatial, temporal, logical, etc.). For example, for a plurality of predefined configurable computation modules, the terms "first" and "second" modules can be used to refer to any two of the predefined configurable computation modules. In other words, the "first" and "second" modules are not limited to logical modules 0 and 1.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Various embodiments of methods and apparatus for assembling multiple configurable computation modules that can be used to manage (e.g., receiving, storing and processing) network analytics data (e.g., web analytics data) are described. Some embodiments may include a means for assembling multiple configurable computation modules. For example, a module assembler may assemble multiple configurable computation modules that can be used to manage network analytics data. The module assembler may, in some embodiments, be implemented by program instructions stored in a computer-readable storage medium and executable by one or more processors (e.g., one or more CPUs or GPUs) of a computing apparatus. The computer-readable storage medium may store program instructions executable by the one or more processors to cause the computing apparatus to perform assembling multiple configurable computation modules, as described herein. Other embodiments may be at least partially implemented by hardware circuitry and/or firmware stored, for example, in a non-volatile memory.

Although certain embodiments are described with respect to online advertisement and offers, it will be appreciated that the techniques disclosed herein may be employed in other data analysis contexts.

Turning now to FIG. 1, a block diagram of a network analytics system 100 is shown in accordance with one or more embodiments of the present technique. In the illustrated embodiment, system 100 includes content providers 102a and 102b, a client 104 and a network analytics provider 106. Each of content providers 102a and 102b, client 104 and network analytics provider 106 may be communicatively coupled to one another via a network 108. Network 108 may include any channel for providing effective communication between each of the entities of system 100. In some embodiments, network 108 includes an electronic communication network, such as the internet, a local area network (LAN), a cellular communications network, or the like. Network 108 may include a single network or combination of networks that facilitate communication between each of the entities (e.g., content providers 102a and 102b, client 104 and network analytics provider 106) of system 100.

Content providers 102a and/or 102b may include source of information/content (e.g., a Hyper Text Markup Language (HTML) file defining display information for a webpage) that is provided to client 104. For example content providers 102a and/or 102b may include vendor websites used to present retail merchandise to a consumer. In some embodiments, content providers 102a and 102b may include respective web content servers 110a and 110b. Web content servers 110a and 110b may include web content stored thereon, such as HTML files that are accessed and loaded by client 104 for viewing webpages of content providers 102a and 102b. In some embodiments, content providers 102a and 102b may serve client 104 directly. For example, content may be provided from each of servers 110a or 110b directly to client 104. In some embodiments, one of content providers 102a and 102b may act as a proxy for the other of content providers 102a and 102b. For example, server 110a may relay content from server 110b to client 104.

Client 104 may include a computer or similar device used to interact with content providers 102a and 102b. In some embodiments, client 104 may include a browser application (e.g., internet web browser application) 112 that can be used to generate a request for content, to render content, and to communicate requests to various devices on the network. For example, upon selection of a website link on a webpage displayed to the user by browser application 112, browser application 112 may submit a request for the corresponding webpage/content to web content server 110a, and web content serve 110a may provide a corresponding HTML file that is executed by browser application 112 to render the requested website for display to the user. In some instances, execution of the HTML file may cause the browser to generate additional request for additional content (e.g., an image referenced in the HTML file as discussed below) from a remote location, such as content providers 102a and 102b and/or network analytics provider 106. The resulting webpage 112a may be viewed by a user via a display device (e.g., monitor) or similar presentation device at client 104.

Network analytics provider 106 may include a system for the collection and processing of network analytics data, and the generation of corresponding network analytics reports including various metrics of the network analytics data. Network analytics data may be web analytics data and may include data that describes usage and visitation patterns for websites and/or individual webpages within the website. Web analytics data may include information relating to the activity and interactions of one or more users with a given website or webpage. For example, web analytics data may include historic and/or current website browsing information for one or more website visitors, including, but not limited to identification of links selected, identification of web pages viewed, identification of conversions (e.g., desired actions taken— such as the purchase of an item), number of purchases, value of purchases, impressions (e.g., page views or ad-impressions), pixels, clicks, conversions (e.g., actual sale on a website), and other data that may help gauge user interactions with webpages/websites. In some embodiments, network analytics data is accumulated over time to generate a set of network analytics data (e.g., a network analytics dataset) that is representative of activity and interactions of one or more users with a given website or webpage. Network analytics data may be processed to generate metric values that are indicative of a particular trait or characteristic of the data (e.g., impressions, number of items purchased, value of items purchased, a conversion rate, etc.). Such processing may be performed with a set of assembled configurable computation modules, as described herein. In some embodiments, some, substantially all, or all of the network analytics data may be accounted for in a single index value.

Network analytics provider 106 may include a third-party website traffic statistic service. Network analytics provider 106 may include an entity that is physically separate from content providers 102a and 102b. Network analytics provider 106 may reside on a different network location from content providers 102a and 102b and/or client 104. In the illustrated embodiment, for example, network analytics provider 106 is communicatively coupled to client 104 via network 108. Network analytics provider may be communicatively coupled to content providers 102a and 102b (e.g., via network 108). Network analytics provider 106 may receive network analytics data from client 104 via network 108 and may provide network analytics data (e.g., network analytics reports or raw analytics data) to content provider 102a and 102b via network 108 or some other form of communication.

In the illustrated embodiment, network analytics provider 106 includes a network analytics server 114, a network analytics database 116, and a network analytics processing module 118. Processing module 118 may include computer executable code (e.g., executable software modules), stored on a computer readable storage medium that is executable by a computer to provide associated processing. For example, processing module may process network analytics datasets stored in database 116 to generate corresponding network analytics reports that are provided to content providers 102a and 102b. Processing module 118 may process network analytics datasets according to assembled configurable computation modules, as described herein. In some instances, processing module 118 may reside in content providers 102a and/or 102b. Assembling multiple configurable computation modules may take place in network analytics provider 106 or content providers 102a and 102b, in various embodiments.

Network analytics server 114 may service requests from one or more clients. For example, upon loading/rendering of a webpage 112a by browser 112 of client 104, browser 112 may generate a request to network analytics server 114 via network 108. Network analytics server 114 and/or processing module 118 may process the request and return appropriate content (e.g., an image) to browser 112 of client 104. In some embodiments, the request includes a request for an image, and network analytics provider 106 simply returns a single transparent pixel for display by browser 112 of client 104, thereby fulfilling the request. The request itself may also include network analytics data embedded therein. Some embodiments may include a content provider embedding a pointer to a resource, known as a "web bug", within the HTML code of the webpage 112a provided to the client. The resource may be invisible to the user, such as a transparent one-pixel image. The pointer may direct browser 112 of client 104 to request the resource from network analytics server 114. Network analytics server 114 may record the request and any additional information associated with the request (e.g., the date and time, and/or identifying information that may be encoded in the resource request).

In some embodiments, an image request embedded in the HTML code of the webpage may include codes/strings that are indicative of network analytics data, such as data about a user/client, the user's computer, the content of the webpage, or any other network analytics data that is accessible and of interest. A request for an image may include, for example, "imageXXX.gif . . . " wherein the string "XXX . . . " is indicative of the network analytics data. Network analytics provider 106 may parse the request (e.g., at server 114 or processing module 118) to extract the network analytics data contained within the request. The network analytics data may be stored in network analytics database 116, or a similar storage/memory device. In some embodiments, processing module 118 may receive or retrieve network analytics data from network analytics server 114 and/or database 116. Network analytics processing module 118 may process the network analytics data to generate one or more network analytics reports. For example, network analytics report module 114 may filter the raw network analytics data received at network analytics server 114 to generate concise and complete network analytics reports, as may be requested by a website administrator of one of content providers 102a and 102b. Reports, for example, may include overviews and statistical analyses describing the relative frequency with which various site paths are being followed through the content provider's website, the rate of converting a website visit to a purchase (e.g., conversion) and so forth.

In some embodiments, a user 120 may interact with a device at client 104 to execute a software application, such as browser application 112 of client 104, for accessing and displaying one or more webpages 112a. In response to a user command, such as clicking on a link or typing in a uniform resource locator (URL), browser application 112 may issue a webpage request 122 to web content server 110a of content provider 102a via network 108 (e.g., via the Internet). In response to request 122, web content server 110a may transmit the corresponding webpage code 124 (e.g., HTML code corresponding to webpage 112a) to browser application 112. Browser application 112 may interpret the received webpage code 124 to display the requested webpage 112a to user 120 at a user interface (e.g., monitor) of client 106. Browser application 112 may generate additional requests for content from the servers, or other remote network locations, as needed. For example, if webpage code 124 calls for content, such as an advertisement or offer to sell, to be provided by content provider 102b, browser application 112 may issue an additional request 126 to web content server 110b. Web content server 110b may provide a corresponding response 128 containing the requested content, thereby fulfilling the request. Browser application 112 may assemble the additional content for display within webpage 112a.

In some embodiments, client 104 also transmits webpage visitation tracking information to network analytics provider 106. For example, as described above, webpage code 124 may include executable code (e.g., a web bug) to initiate a request for data from network analytics server 114 such that execution of webpage code 124 at browser 112 causes browser 112 to generate a corresponding request 130 for the data to network analytics server 114. In some embodiments, request 130 may itself have network analytics data contained/embedded therein, or otherwise associated therewith, such that transmitting request 130 causes transmission of network analytics data from client 104 to network analytics provider 106. For example, as described above, request 130 may include an image request having an embedded string of data therein. Network analytics provider 106 may process (e.g., parse) request 130 to extract network analytics data 132 contained in, or associated with, request 130. In some embodiments, request 130 from client 104 may be forwarded from server 114 to database 116 for storage and/or to network analytics processing module 118 for processing. Network analytics processing module 118 and/or server 114 may process the received request to extract network analytics data 132 from request 130. Where request 130 includes a request for an image, network analytics server 114 may simply return content/image 134 (e.g., a single transparent pixel) to browser 112, thereby fulfilling request 128. In some embodiments, network analytics server 106 may transmit network analytics data and/or a corresponding network analytics reports to content providers 102a and/or 102b, or other interested entities. For example, network analytics data 132 and/or network analytics reports 140a and 140b (including processed network analytics data) may be forwarded to site administrators of content providers 102a and 102b via network 108, or other forms of communication. In some embodiments, a content provider may log-in to a website, or other network based application, hosted by network analytics provider 106, and may interact with the website/application to generate custom network analytics reports. For example, content provider 102a may log into a network analytics website via website server 114, and may interactively submit request 142 to generate reports for various metrics (e.g., number of conversions for male users that visit the home page of the content provider's website), and network analytics provider 106 may return corresponding reports (e.g., reports dynamically generated via corresponding queries for data stored in database 116 and processing of the data via module 118). Such a request 142 may include input to select, configure, and assemble configurable computation modules that can then be used to process the data. In some embodiments, content providers 102a and 102b may provide network analytics data 132 to network analytics provider 106.

In some embodiments, reports may include one or more metric values that are indicative of a characteristic/trait of a set of data. For example, a report may include a purchase value metric that represents monetary value of purchases by one or more consumers over a given period of time. The purchase value metric may be generated by processing a large network analytics dataset for the given time period to extract purchases, determining a total value for the purchases based on the processing, and generating the corresponding purchase value metric. The purchase value metric may be used, for example, to determine what type of webpage content should be provided to one or more consumers based on their purchase history, as indicated by the purchase value metric. For example, where the consumer has requested to view a webpage, a first advertisement—for a high priced product—may be provided for display with the webpage if the purchase value metric associated with the particular consumer or the consumer's demographic exceeds a threshold value, or a second advertisement—for a lower priced product—may be provided for display with the webpage if the purchase value metric associated with the particular consumer or the consumer's demographic does not exceed the threshold value.

Figure 9:
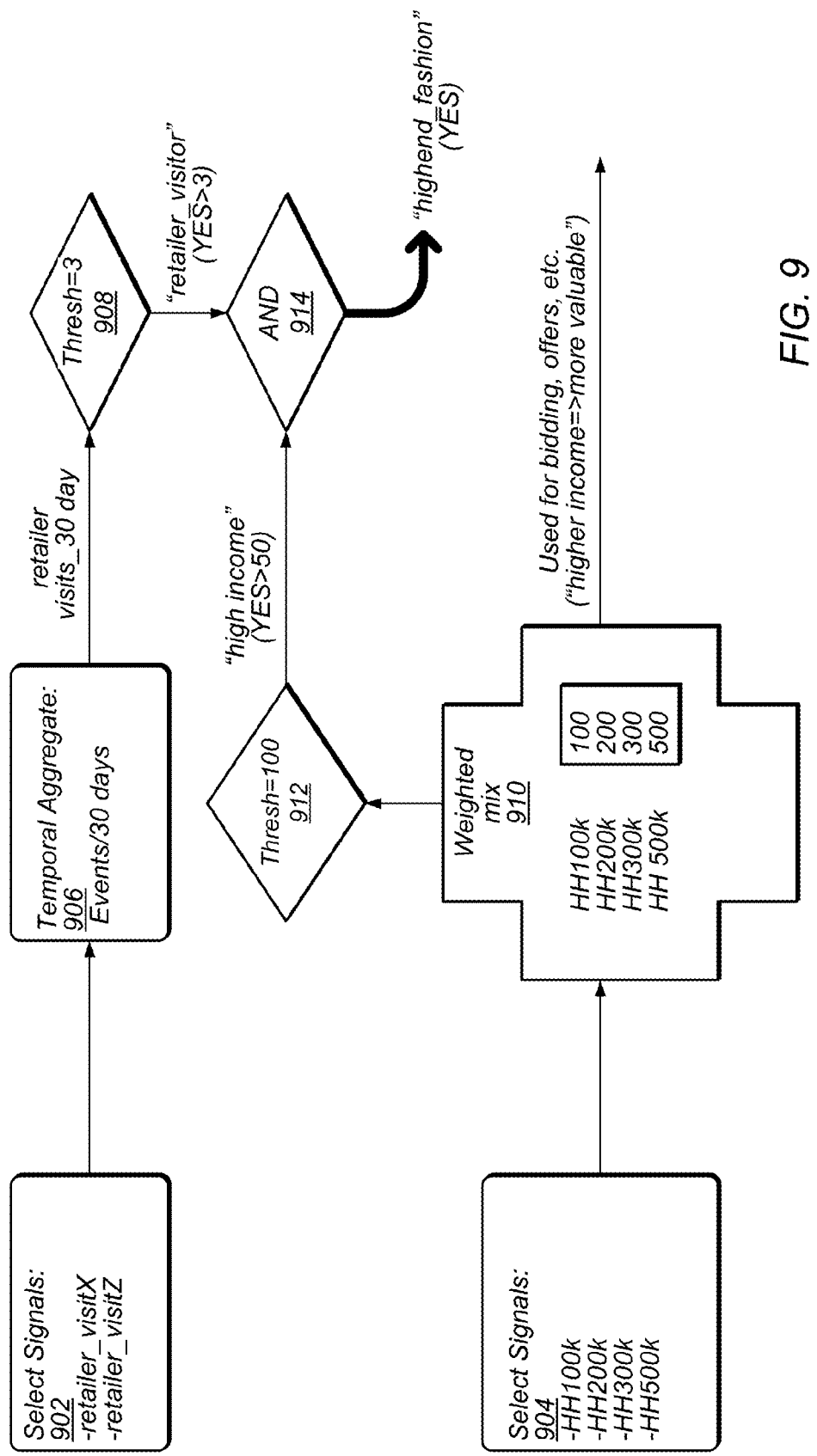
FIG. 9 illustrates a block diagram of example data analysis based on assembled modules, according to some embodiments.

In various embodiments, network analytics data 132 and/or network analytics reports 140a and 140b may be processed according to assembled configurable computation modules. For example, an interface may be used to select, configure, and/or assemble multiple predefined modules, as described herein. Such selecting, configuring, and/or assembling may occur in content providers 102a/102b, analytics provider 106, or in a combination thereof. The assembled modules may then process, or further process the analytics data. As one example, a retailer associated with content provider 102a may want to identify a high-end fashion segment. Such an example is illustrated in FIG. 9. As shown in FIG. 9, various modules may be assembled, including a temporal aggregation module, two threshold modules, a logical combination module, and a weighted mix module. Returning to FIG. 1, the result of the assembled modules processing the network analytics data is that the content provider 102a/102b may direct a targeted advertisement, bid, or offer to users identified as part of the high-end fashion segment. Note that other data may also be processed by the assembled modules. For example, a user may have a profile that describes basic demographic information (e.g., male/female, income, age, kids/no kids, etc.). The profile may be stored in a data store managed by content provider 102a/102b. The data store may not necessarily reside at content provider 102a/102b. For example, the data store of profile information may be located at a third party data provider. In some embodiments, selecting, configuring, and/or assembling the modules may occur in content provider 102a/102b whereas in other embodiments, selecting, configuring, and/or assembling the modules may occur in analytics provider 106. Still, in other embodiments, selecting, configuring, and/or assembling may be partitioned between content provider 102a/102b and analytics provider 106.

In some embodiments, an index value may be used to represent some or all of a set of data. For example, a single index value may be calculated for an entire network analytics dataset or subset of the dataset. The index value may correspond to a particular metric for the set of data. For example, where a dataset contains data for a plurality of purchases, purchase value index may represent monetary value of purchases by one or more consumers over a given period of time. An index value may be used a metric, or may be used to compute a corresponding metric. In some embodiments, index values corresponding to a dataset may be used in place of the dataset itself. For example, a single index value corresponding to a given dataset may be stored and processed (e.g., iteratively updated) to provide a single value that is representative of the entire dataset, as opposed to having to store and process the entire dataset each time a metric is requested.

The content provider may use an index value, such as that stored in a cookie of a client, to make dynamic decisions as to what content (e.g., advertisement, offer to sell, etc.) is provided to the client by simply accessing and/or storing the index value, and may not require a query of the corresponding dataset. For example, upon receiving a query for a total amount of purchases by a consumer, the index value (or some variant thereof) may be provided. The index data may be updated iteratively in some embodiments.

Figure 2:
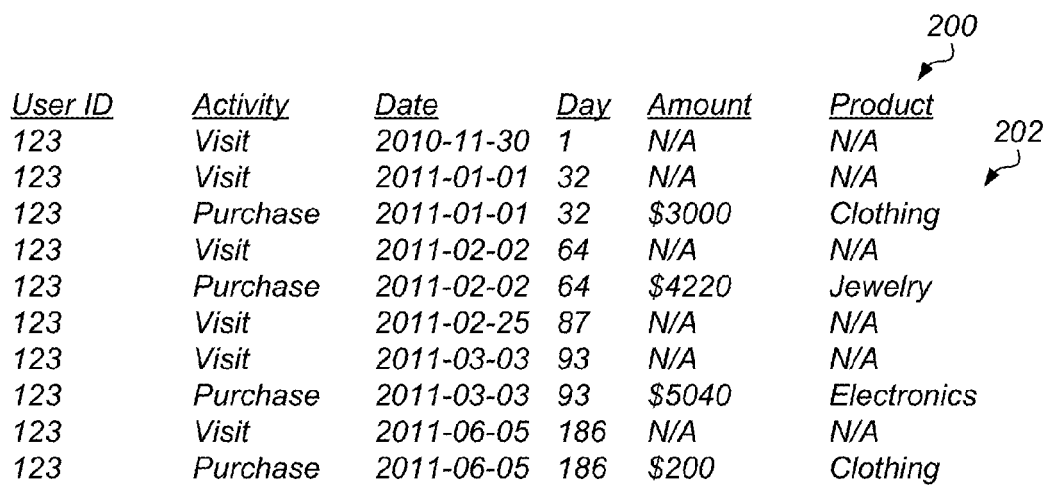
FIG. 2 is a table that depicts an exemplary network analytics dataset, according to some embodiments.

Turning now to FIG. 2, a table 200 is shown that depicts an exemplary network analytics dataset 202, according to one or more embodiments. Dataset 202 may be indicative of at least a portion of activity by user (e.g., website visitor) 120 on a retail website of content provider 102a (e.g., a website that sells clothing, electronics, shoes, and/or jewelry, etc.). With regard to FIG. 1, dataset 202 may be represent at least a portion of network analytics data 132 that is transmitted to network analytics provider 106 from client 104 via request 130. For example, as user 120 browses and interacts with web pages of a website operated by content provider 102a, the client's browser application 104 may generate request 130 having activity data and/or index data embedded therein, and network analytics provider 106 may parse the request to generate and store dataset 202 in database 116.

In an exemplary embodiment, content provider 102a, or other entities, may be interested in tracking the number and value of purchases by visitors to their website. Such information may be of interest, for example, to enable content provider 102a to serve customized content (e.g., advertising, offers, etc.) to user 120 based at least in part on their past browsing activity. Based on the desire to track the number and value of purchases, relevant activity data may include purchases made by a particular user. For example, with regard to dataset 202, relevant activity data for a user having an ID of "123" may include the "purchases" activities of dataset 202, as these include an actual purchase as well as a monetary value of the purchase. As shown, dataset 202 may also include visit activities for a user (e.g., user with ID "123"). Such data may be processed by the disclosed assembled configurable computation modules/blocks to serve the customized content.

Figure 3:
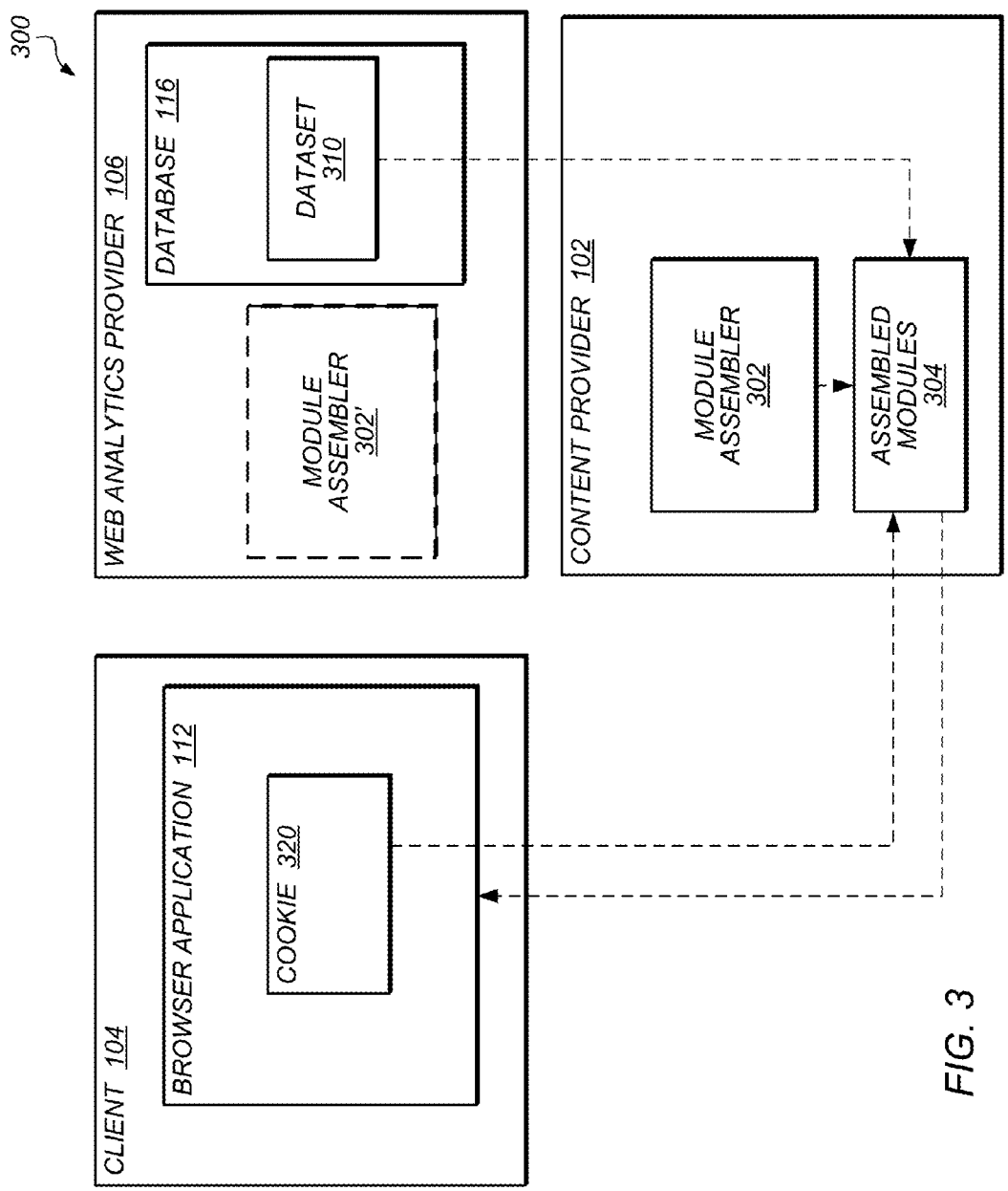
FIG. 3 is a block diagram that illustrates an exemplary configurable computation module assembling system, according to some embodiments.

FIG. 3 is a block diagram that illustrates a configurable computation module assembler system 300, according to some embodiments of the present technique. As shown, configurable computation module assembler system 300 may include module assembler 302. As shown, module assembler 302 may, in some embodiments, reside in analytics provider 106, and in some embodiments, in content provider 102 (shown as module assembler 302'). In other embodiments, module assembler 302 may be apportioned between network analytics provider 106 and content provider 102. For example, receiving inputs to select and configure multiple modules may occur in content provider 102 and assembling the selected and configured modules may occur in network analytics provider 106.

During use, module assembler 302 may receive input indicating a selection of multiple modules from a number of predefined configurable computation modules and may receive additional input to configure the selected modules. The additional input may define one or more module inputs to each selected module and one or more connections between the selected modules. Module assembler 302 may then assemble the modules based on the received inputs into assembled modules 304, which may be used to perform analysis on data (e.g., from cookie 320, dataset 310, etc.) received at the respective one or more inputs. As one example, the analysis performed may result in an online advertisement or offer to sell being sent to a user of browser application 112. The analysis may determine that a particular user is a high-end fashion user and as a result, an advertisement for one or more expensive fashion items may be sent to the user. At the same time or at another time, the analysis may determine that another user is a low-end fashion user resulting in an advertisement for a less expensive fashion item being sent to the user.

Figure 4:
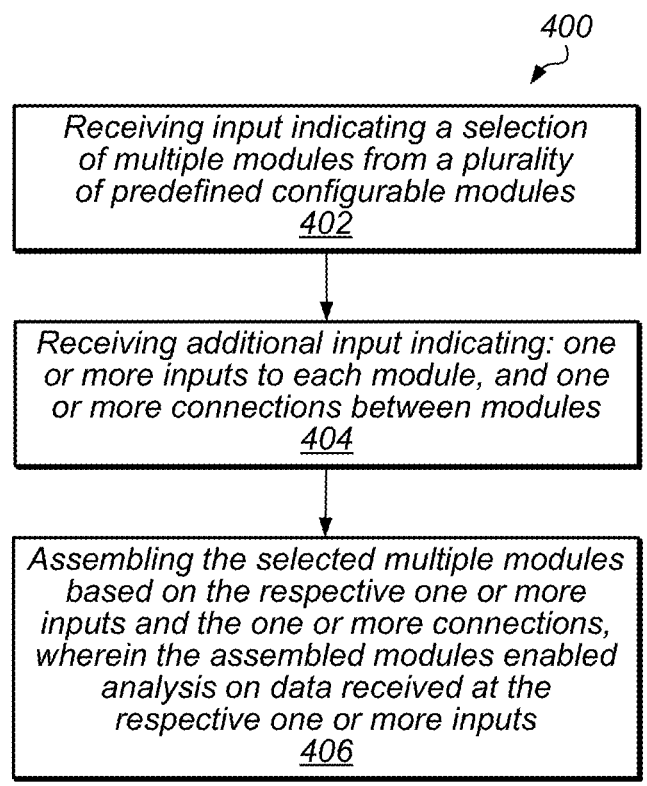
FIG. 4 is a flowchart that illustrates a method of assembling configurable computation modules, according to some embodiments.

Turning now to FIG. 4, a method 400 illustrates one embodiment of assembling multiple configurable computation modules. While the blocks are shown in a particular order for ease of understanding, other orders may be used. In some embodiments, the method of FIG. 4 may include additional (or fewer) blocks than shown. In the illustrated embodiment, method 400 may be implemented by module assembler 302.

As shown at 402, input may be received that indicates a selection of multiple modules from a plurality of predefined configurable computation modules. In various embodiments, a graphical user interface may be presented that allows selection of the modules. For instance, graphical representations of the modules may permit dragging and dropping a module to select it. The selected modules may be placed or moved around in the interface to represent an overall flow. For instance, if three modules are selected and data is to be processed by the assembled modules sequentially, then the modules may be laid out from left to right in a sequential order that represents the order in which data may be processed by the assembled modules. In some embodiments, layout of the modules within the interface may be performed or adjusted in response to inputs received at 404. For example, modules may originally be laid out in the interface in the order in which they are selected or in the order in which they were placed within the interface. The inputs received at 404, however, may cause the modules to be rearranged in the interface to simplify the display of connections, for instance. Predefined is used herein to mean that the types and number of modules that may be selected from are a finite set of modules that may represent the computational spectrum (e.g., canonical fundamental calculations) to allow flexibility of implementing a wide variety of preferences, rules, and algorithms. In some embodiments, the finite set may be fixed such that the selection of modules may be limited to a fixed number of different types of modules.

Each module may be configured to perform an operation (e.g., one or more computations) associated with its particular type. Example module types may include temporal aggregate, thresholding, weighted mix, or a logical combination. Other types may also be used to further augment the computational spectrum. Thus, if a retailer desires for network analytics data to be temporally aggregated and then thresholded, then one instance of the temporal aggregation module and one instance of the thresholding module may be selected. Note that multiple instances of a single type of module may be selected. An example of multiple instances of a single module type (e.g., multiple thresholding modules) is shown in FIG. 9. Each of the example module types are described herein at FIGS. 5A-D, 6, 7A-C, and 8. In some embodiments, each predefined configurable computation module may include one or more outputs and one or more inputs. The number of outputs and inputs may be a default number based on the type of module. For example, a thresholding module may have a single input and a single output. In some instances, the number of outputs and/or inputs may be configurable at 402 or 404.

At 404, input may be received configuring the selected modules. Configuring may include defining one or more module inputs to each selected module, and defining one or more connections between selected modules. Selection of a module at 402 may present a set of configurable options and/or parameters. For instance, in a graphical user interface, options, parameters, and other configurable items (e.g., connections) may be presented in a pop-up window or within a graphical display of the selected module. Such options and/or parameters may vary depending on the selected module. For example, one type of module may have more choices on how to configure it than another type of module does. Various configurable options and parameters are described along with the various module types at FIGS. 5A-D, 6, 7A-C, and 8. Other input may also be received that define one or more parameters for one of the modules. One or more inputs to one of the selected modules may be a connection between that module and another module. For instance, consider an example with two selected modules, a first module and a second module. The first module may have two inputs and one output and the second module may have a single input and a single output. The output of the first module may connect to the single input of the second module. As a result, the input to the second module may be the connection between the first and second modules.

In some embodiments, upon selection of a module at 402, various options may be presented (e.g., in a display of the module or in a pop-up window) to facilitate configuring the selected module at 404. Accordingly, the input indicating selection of multiple modules at 402 may be followed by receiving additional input at 404 to configure a given selected module before subsequent modules can be selected and configured. In other embodiments, multiple modules may be selected at 402 before input is received at 404 to configure each module.

As illustrated at 406, the selected modules may be assembled based on the respective defined one or more module inputs and the defined one or more connections. A graphical user interface may receive an input to finalize the selected and configured modules and, in turn, assemble the modules. The assembled modules may then be used to analyze data received at the respective one or more inputs. Data received may be analytics data. For example, the analytics data may be provided in a cookie directly to a content provider and/or analytics provider, depending on where the assembled modules reside. Analytics data may alternatively be provided from a data store (e.g., database 116), for example, at analytics provider. For instance, the analysis may be usable to perform targeted online advertisement. The analysis may result in a probability score (e.g., 0 to 100), a binary value (e.g., representing yes or no), and/or a decision on which customized content to present to a user of browser application 112.

A content provider's preferences may change over time or various content providers may have different preferences. Thus, in some embodiments, input may be received indicating another selection of multiple modules from the plurality of predefined configurable computation modules. Additional input may also be received indicating another one or more inputs to each selected module and another one or more connections between the selected modules. The modules may then be assembled according to the new inputs. The assembled modules based on the new inputs may differ from the previous assembled modules in that the assembled group of modules may include additional, fewer, or different modules, and/or that one or more of the inputs to the modules and/or one or more connections have changed. Or, as another example, one or more module parameters may be different. For instance, the thresholding value for a thresholding module of a first set of assembled modules may be different than the thresholding value for a thresholding module of a second set of assembled modules. Or the second set of assembled modules may include an additional module not included in the first set. Or both sets may include the same selected modules but the modules may be connected differently in the second set than the first set.

It will be appreciated that method 400 is an exemplary embodiment of a method employed in accordance with techniques described herein. Method 400 may be may be modified to facilitate variations of its implementations and uses. Method 400 may be implemented in software, hardware, or a combination thereof. The order of method 400 may be changed, and various elements may be added, reordered, combined, omitted, modified, etc.

Although some embodiments have been described with respect to a content provider, other embodiments may be employed by one or more other entities, such as a network analytics provider.

Figure 5A:
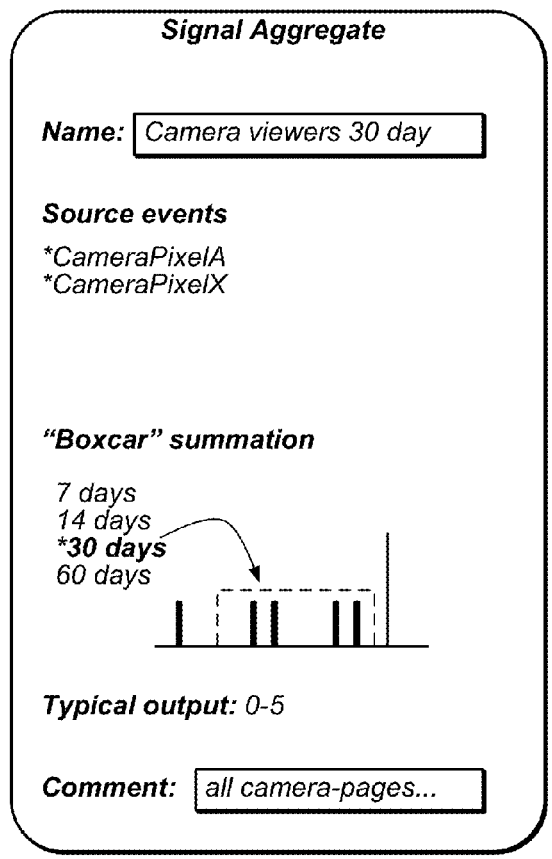
FIGS. 5A-5D illustrate an example configurable computation module, according to some embodiments.
Figure 5B:
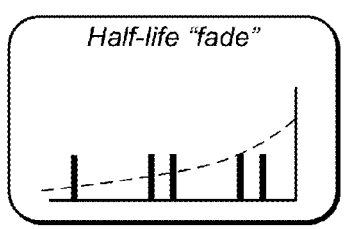
Figure 5C:
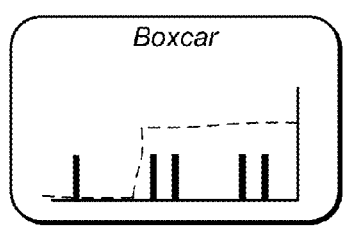
Figure 5D:
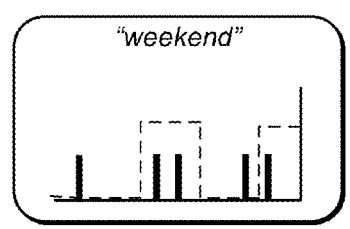

FIG. 5A illustrates an example temporal aggregate module. As shown, FIG. 5A may represent an example graphical display of the temporal aggregate module in a graphical user interface. The displayed module in FIG. 5A may reflect the selection and configuration of the module from blocks 402 and 404 of method 400. The illustrated module includes a header, a name field, source events, an operation type, a typical output, and a comment field. In some instances, source events, operation type, and typical output may be automatically populated in the display after input is received, at blocks 402 and 404, to select and configure the module. The top most portion of the module reads "Signal Aggregate" to indicate that it is a temporal aggregate module. The module also includes an ID or name for the configured operation. Here, that name is "Camera viewers 30 day." Other modules may then reference the result of the module by using the name. For instance, if the output of the module of FIG. 5A is used by a thresholding module, the thresholding module may be configured at 402 and/or 404 to receive as its input the output of "Camera viewers 30 day". Source events indicate the respective one or more module inputs received at block 404 of method 400. Source events may be signal inputs. Inputs to modules that are referred to as signals may include an indication of occurrences of an event (e.g., a product page view for a website). In this example, CameraPixelA and CameraPixelX indicate that this module has two inputs. The operation type of the illustrated module is a "Boxcar" summation. The displayed module additionally indicates one or more parameters. In the example shown, the parameter for the boxcar summation is 30 days meaning that a 30 day time period is used for the boxcar summation. As shown, other definable time periods may include 7 days, 14 days, and 60 days. In some embodiments, the number of days may be an open ended continuum whereas in other embodiments, a finite number of parameter choices maybe defined (e.g., 7, 14, 30, and 60 days). Moreover, the resolution may be finer or coarser than days. Thus, aggregation may be over a period of seconds, minutes, or hours, or over weeks, months, or years. FIGS. 5B-D illustrate three operation types for temporal aggregation. Other non-illustrated types may also be employed. FIG. 5B shows a half-life (fade) type aggregation where recent data is weighted more than older data. Like FIG. 5A, FIG. 5C illustrates a boxcar type aggregation whereas FIG. 5D shows a weekend type aggregation where certain periods (e.g., weekend) are included in the aggregation and other periods are not. Turning back to FIG. 5A, a typical output range is defined as 0-5 for this example. In one embodiment, the aggregation may be normalized to a 0-5 scale, it may be capped at 5, or it may just represent typical behavior with the output being the aggregate of the sum events for the period of aggregation. The output may be used to determine the trait. For instance, an output of 4-5 may represent a value/trait associated with high volume (e.g., a frequent visitor to a website) and a certain segment, whereas an output of less than 4 may be a value/trait associated with low volume (e.g., an infrequent visitor to a website) and a different segment. Also shown, the displayed module may include a comment portion where comments may be entered that may not have an effect on the computation of the module. The comment may be descriptive of the intended effect of the operation.

In various embodiments, the input to the temporal aggregation module may be a single signal or multiple signals. The multiple signals may be weighted with one or more weight vectors. As an example, the source signal CameraPixelA may be weighted by 0.5 and CameraPixelX may be weighted by 1.0. The weight vectors may be defined by a source:value pair. Accordingly, the weight vectors in the above example may be CameraPixelA:0.5 and CameraPixelB:1.0. The value may be a float or short-float. Note that other modules may also utilize weight vectors to weight the source signals or input values/traits, as output from another module. When weighting signals, the weights may be relatively small (e.g., [−1,1]) whereas when weighting values/traits or scores, the weights may be any value.

Figure 6:
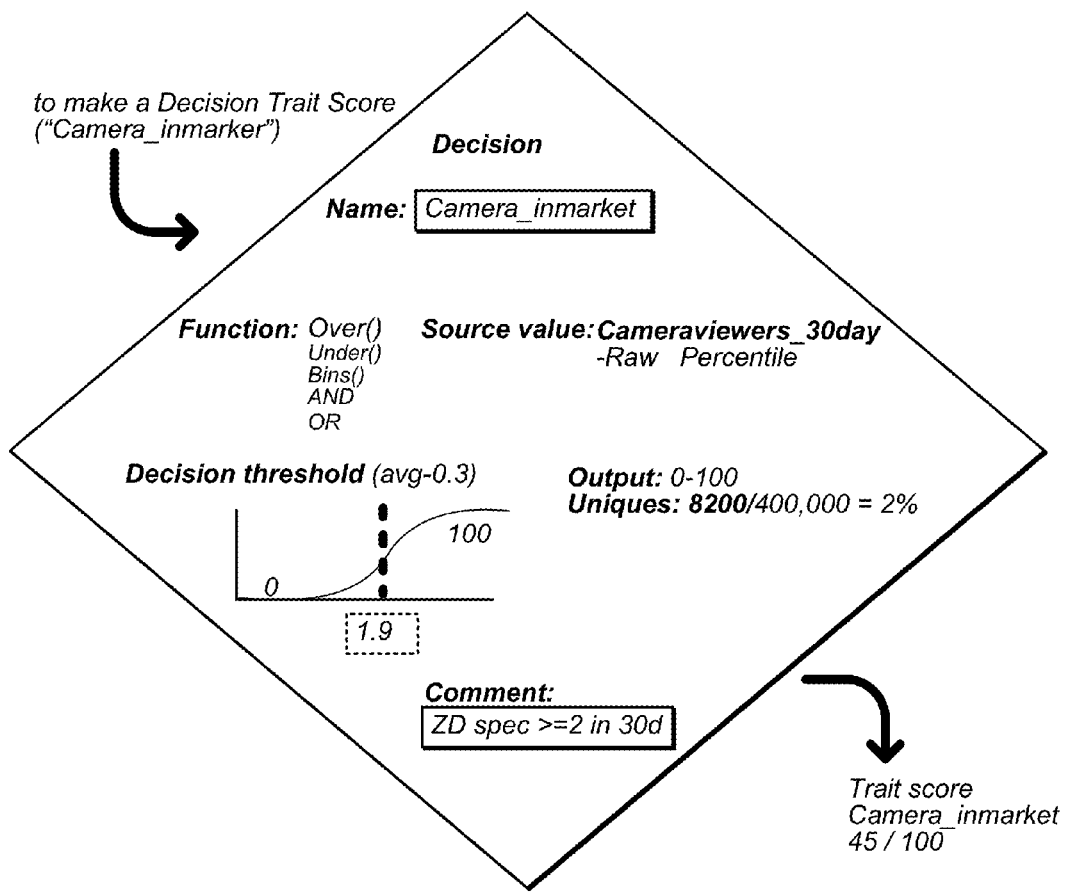
FIG. 6 illustrates another example configurable computation module, according to some embodiments.

FIG. 6 illustrates an example thresholding module. As shown, FIG. 6 may represent an example graphical display of the thresholding module in a graphical user interface. The displayed module in FIG. 6 may reflect the selection and configuration of the module. The illustrated module includes a header, a name field, a function, a source value, threshold parameters, an output, a uniques percentage, and a comment field. In some embodiments, the source value and output for the thresholding module may be a single input and single output. The header, name field, and comment field may be similar to that of the temporal aggregate module and other modules. Functions may include over, under, bins, AND, and OR. For instance, over may mean that the thresholding module determines if the source value is over the threshold. The source value may be an output from another module, such as a temporal aggregate module. As shown, the source value is cameraviewers 30 day, which may be the output from the temporal aggregation module of FIG. 5A. Source value may include one or more parameters (e.g., raw, percentile) that may be specified. Raw and percentile may specify whether the source value is a raw number or a percentage. Decision threshold may be set in a variety of ways. It may be a simple binary over/under threshold. For example, the 1.9 value may be a simple step function such that there is a hard over/under cutoff at 1.9. As depicted in FIG. 6, the decision threshold may be a smooth, or fuzzy, decision on a scale such as 0-100. A soft/fuzzy embodiment may retain more of the source information yet may be easily converted into a binary decision by assigning number values to the score (e.g., 50 is "YES", less than 50 is "NO"). Accordingly, the output may be a score from 0-100, or a binary value representing yes or no indicating whether the threshold is met. As one example for a thresholding module using 1.9 as a soft cutoff, consider a scenario in which the input value to the thresholding module has a range of 0-10. The output produced by a soft cutoff may not be linear. For instance, an input value of 1 may yield an output score of 20, an input value of 2 may yield a 51, and an input value of 7 may yield a 90. FIG. 6 also illustrates that the thresholding module may determine the number of unique hits (e.g., representing separate visits separated by a certain time) from the analytics data.

Figure 7A:
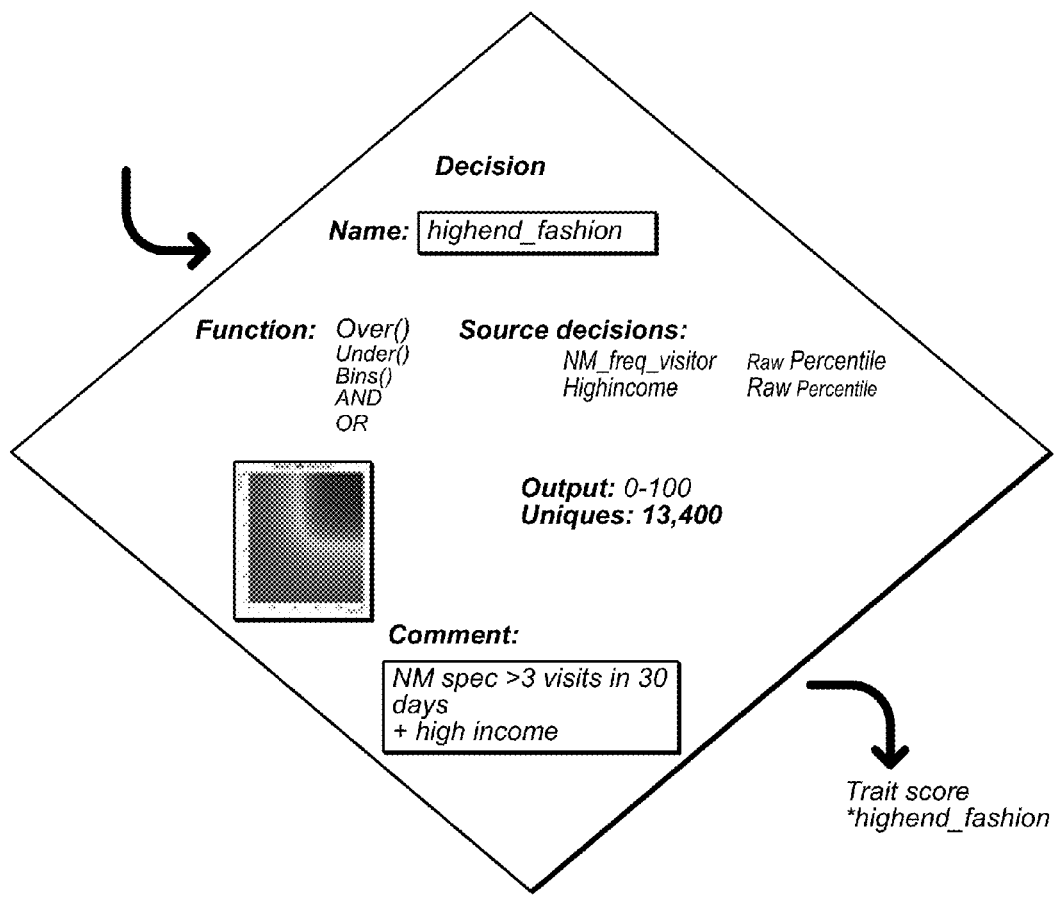
FIGS. 7A-7C illustrate another example configurable computation module, according to some embodiments.
Figure 7B:
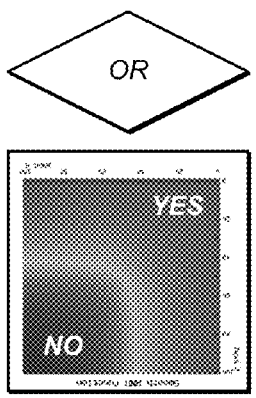
Figure 7C:
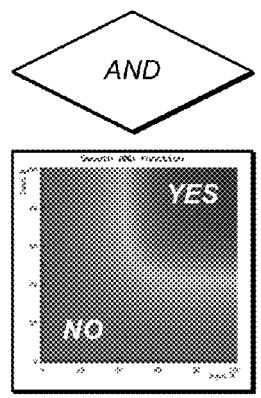

FIG. 7A illustrates an example logical combination module. As shown, FIG. 7A may represent an example display of the logical combination module in a user interface. The displayed module in FIG. 7A may reflect the selection and configuration of the module. The illustrated module includes a header, a name field, a function, a source value, an output, quantity of uniques, and a comment field. FIGS. 7B and 7C illustrate simplified depictions of OR and AND modules, respectively. FIGS. 7B and 7C also illustrate logic diagrams of fuzzy yes/no decisions for the OR and AND modules, respectively. Note that the diagrams are for OR and AND modules having two inputs. In the logic diagrams of FIGS. 7B and 7C, the axes passing through the middle of each diagram, horizontally and vertically, may represent 0 for each of two inputs. Accordingly, in FIG. 7B, the lower left quadrant may represent where both input values are 0 and the other three quadrants may represent where one or both input values are 1. Note that the dividing line between a "NO" and "YES" is fuzzy in the examples of FIGS. 7B and 7C. Thus, the "NO" or "YES" may have a score associated with it such that a "YES" having a score of 95 may be stronger or more certain than a "YES" having a score of 51. The dividing line may be strict in other examples. Decisions, smooth or strict, may be logically combined to produce another decision (e.g., for cascading, nested, or hierarchical logical combinations).

Figure 8:
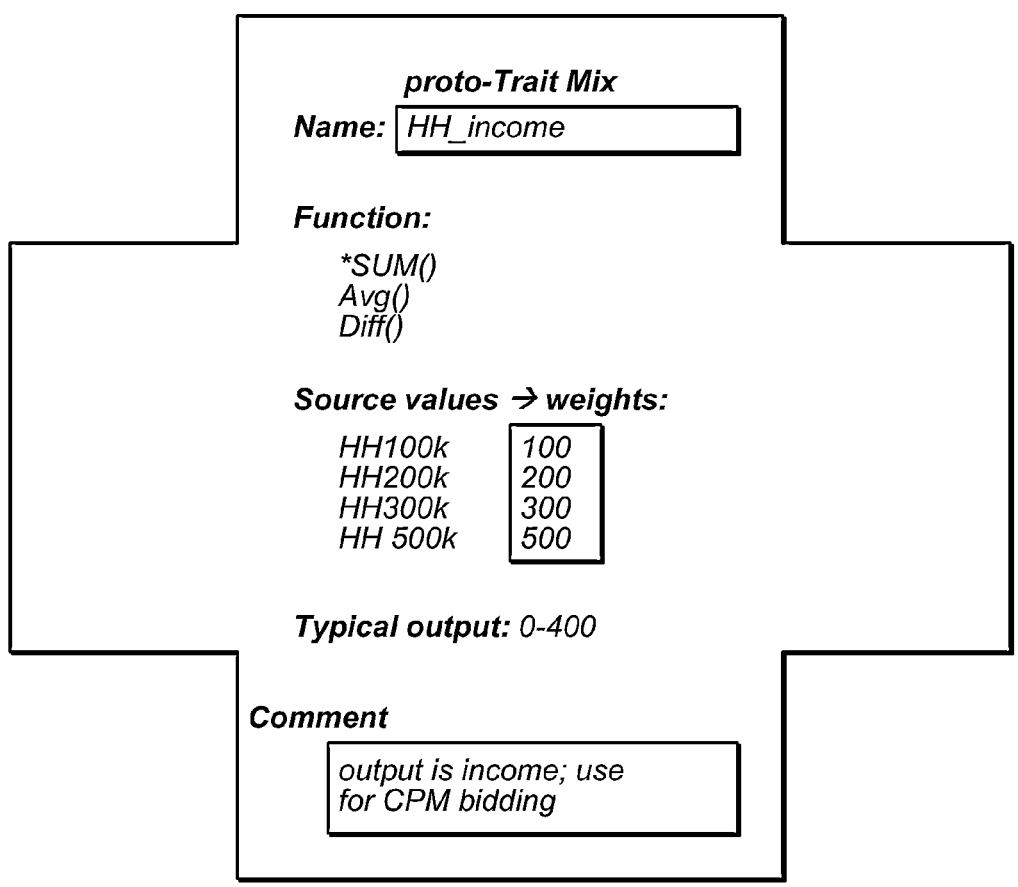
FIG. 8 illustrates another example configurable computation module, according to some embodiments.

FIG. 8 illustrates an example weighted mix module. As shown, FIG. 8 may represent an example graphical display of the logical combination module as can be seen in a graphical user interface. The displayed module in FIG. 8 may reflect the selection and configuration of the module. The illustrated weighted mix module includes a header, name, function, source values and corresponding weights, typical output, and comment. Functions for the weighted mix include a sum, average, and difference. In some embodiments, a separate difference function may not be necessary and a sum may handle both summing and difference type operations. As shown, the illustrated module includes four source values with corresponding weights. The source values may represent income levels, 100,000, 200,000, 300,000, and 500,000. The income levels may be computed based on previous purchase activity and therefore may be the result of processing by other modules. In other instances, the source values of income levels may be retrieved from a user profile. For instance, a user's profile may indicate that the user's income is 300,000. When the income level is retrieved from the profile, the weight of 300 may be applied to give the output for that particular user.

Modules may be selected, configured, and assembled in a variety of ways. An example of one such arrangement is shown in FIG. 9. FIG. 9 illustrates a block diagram of example data analysis based on assembled modules, according to some embodiments. The illustrated example is in the online advertising context but applies in other contexts as well. As illustrated, input signals may be received at 902 and 904. The input signals may be web analytics data and may be raw or processed. Further, as noted herein, one of the inputs may be retrieved from a user profile or other data store instead of being web analytics data. Additionally, the input can be a trait/value or score as produced by another module. Temporal aggregate module 906 may receive the signals retailer_visitX and retailer_visitZ from input 902. As shown, temporal aggregate module 906 may aggregate the number of events over a thirty day period. Here, the events may be visits to webpages identified as retailer_visitX and retailer_visitZ. X may represent one of the retailer's electronics webpages and Z may represent one of the retailer's clothing webpages. The illustrated embodiment does not show what type of aggregating but, as described herein, any type of aggregating (e.g., boxcar, half-life, etc.) may be specified during configuration of the module. As shown, temporal aggregate module 906 may output a single value retailer visits_30 day, which may then be an input to thresholding module 908. As shown, the threshold value in module 908 may cause the module to determine whether the input to the module is greater than 3. The threshold may be a strict or fuzzy threshold. A score of the threshold, which may be binary if strict or a value on a scale (e.g., 0-100) if fuzzy, may then be provided to logical combination module 914, shown as AND module 914. Weighted mix module 910 may receive one or more signals 904 and performed a weighted mix/blend. Weighted mix module 910 may include two outputs, one that may be directly used for bidding, offers, etc. where the higher the income, the more valuable the offer, with the other output provided as an input to thresholding module 912. Thresholding module 912 uses a greater than 100 threshold to yield a score where greater than 50 is a YES as being a high income consumer. The output from thresholding module 912 may be provided as the other input to AND module 914. The output of AND 914 may indicate whether a consumer is part of a high end fashion segment. The output of AND 914 may be used for online advertisements, bidding, and offers. For example, if the user has been identified by the computations in the assembled modules as being a high end fashion consumer, offers and advertisements transmitted to that consumer may be for high end fashion products as opposed to advertisements for other high end products or low end fashion products. Note that different combinations of modules may be selected, configured, and assembled such that a consumer may be identified as being a member of multiple different segments. Advertisements may then be directed to any one of the consumer's identified different segments. Or, the content provider may assemble a very large complex arrangement of modules such that many different alternative segments or multiple segments may be identified for a given consumer.

Exemplary Computer System

Figure 10:
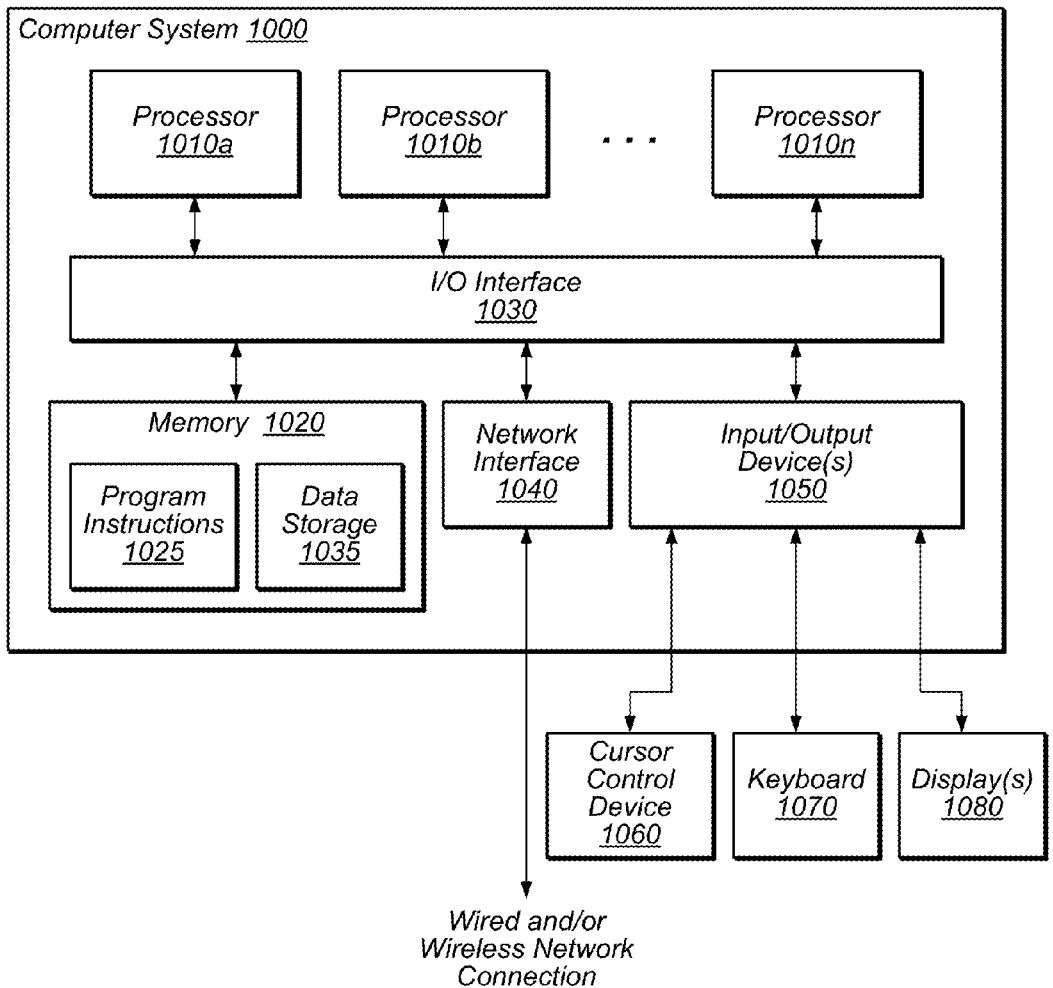
FIG. 10 is a diagram that illustrates an exemplary computer system, according to some embodiments of the present technique.

Various portions of systems 100, and 300 and method 400, as described herein, may be executed on one or more computer systems, which may interact with various other devices. For example, content providers 102*a*/102*b*, client 104, network analytics provider 106, web content servers 110*a*/110*b*, browser application 112, network analytics server 114, network analytics database 116, network analytics processing module 118, module assembler 302, and/or assembled modules 304 may each include, employ or be executed on one or more computer systems. FIG. 10 is a diagram that illustrates an exemplary computer system 1000 in accordance with one or more embodiments of the present technique. In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, audio device 1090, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit (GPU) may be considered a dedicated graphics-rendering device for a personal computer, workstation, game console or other computer system. GPUs may be very efficient at manipulating and displaying computer graphics and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods disclosed herein for layout-preserved text generation may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for a module assembling method, are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040. Program instructions may include instructions for implementing the techniques described in method 400.

In some embodiments, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network (e.g., network 108), such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

Memory 1020 may include program instructions 1025, configured to implement embodiments of a module assembling method as described herein, and data storage 1035, comprising various data accessible by program instructions 1025. In one embodiment, program instructions 1025 may include software elements of a module assembling method illustrated in the above Figures. Data storage 1035 may include data that may be used in embodiments. In other embodiments, other or different software elements and/or data may be included.

Those skilled in the art will appreciate that computer system 1000 is merely illustrative and is not intended to limit the scope of a module assembling method as described herein. In particular, the computer system and devices may include any combination of hardware or software that can perform the indicated functions, including computers, network devices, internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the disclosed embodiments may be practiced with other computer system configurations. In some embodiments, portions of the techniques described herein (e.g., preprocessing of script and metadata may be hosted in a cloud computing infrastructure.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the embodiments embrace all such modifications and changes and, accordingly, the above description to be regarded in an illustrative rather than a restrictive sense.

What is claimed is:

1. A computer-implemented method comprising:
receiving a user selection of a computational module from a plurality of computational modules, wherein the computational module is predefined to process module input to provide module output;
configuring the computational module by:
specifying that the module input is website interaction information; and
specifying a function or a parameter customizing how the computational module will process the module input to provide a website-navigation-specific analysis of the website interaction information resulting in customized module output, wherein the website-navigation-specific analysis comprises temporal aggregation of the website interaction information by a temporal aggregation module of the plurality of computational modules, the temporal aggregation module utilizing multiple signals of the website interaction information as input to produce the module output, wherein the website interaction information is weighted with one or more weight vectors; and
assembling the computational module based on the specifying of the module input and the specifying of the function or the parameter, wherein the configuring and assembling are performed by a computer device.

2. The method of claim 1, wherein the website-navigation-specific analysis comprises thresholding of the website interaction information by a thresholding module of the plurality of computational modules.

3. The method of claim 2, wherein the thresholding module evaluates the module input with respect to one or more threshold parameters to produce the module output.

4. The method of claim 1, wherein the website-navigation-specific analysis comprises weighted mixing of the website interaction information by a weighted mix module of the plurality of computational modules.

5. The method of claim 4, wherein the weighted mix module applies one or more weight values to one or more module inputs to produce the module output.

6. The method of claim 1 wherein the website-navigation-specific analysis comprises a logical combination of the website interaction information by a logical combination module of the plurality of computational modules.

7. The method of claim 6, wherein the logical combination module utilizes two module inputs and an OR or AND logical expression to produce the module output.

8. The method of claim 1, further comprising configuring an additional module to receive the customized module output perform an additional website-navigation-specific analysis.

9. The method of claim 1, wherein the module output is utilized to perform targeted advertising.

10. The method of claim 1, wherein the module input includes demographic information related to a user of a particular website.

11. The method of claim 1, wherein the module input includes visitor-specific information related to a user of a particular website.

12. A computer apparatus comprising:
a processor;
a user interface for receiving a user selection of a computational module from a plurality of computational modules, wherein the computational module is predefined to process module input to provide module output;

a configuration component for configuring the computational module by:

specifying that the module input is website interaction information; and specifying a function or a parameter customizing how the computational module will process the module input to provide a website-navigation-specific analysis of the website interaction information resulting in customized module output, wherein the website-navigation-specific analysis comprises temporal aggregation of the website interaction information by a temporal aggregation module of the plurality of computational modules, the temporal aggregation module utilizing multiple signals of the website interaction information as input to produce the module output, wherein the website interaction information is weighted with one or more weight vectors; and an assembling component for assembling the computational module based on the specifying of the module input and the specifying of the function or the parameter, wherein the configuring and assembling are performed by a computer device.

13. The computer apparatus of claim 12, further comprising configuring an additional module to automatically select a targeted advertisement based on the module output, wherein the targeted advertisement is provided on the website.

14. A non-transitory computer-readable medium on which is encoded program code, the program code comprising:

program code for receiving a user selection of a computational module from a plurality of computational modules, wherein the computational module is predefined to process module input to provide module output;

program code for configuring the computational module by:

specifying that the module input is website interaction information; and specifying a function or a parameter customizing how the computational module will process the module input to provide a website-navigation-specific analysis of the website interaction information resulting in customized module output, wherein the website-navigation-specific analysis comprises temporal aggregation of the website interaction information by a temporal aggregation module of the plurality of computational modules, the temporal aggregation module utilizing multiple signals of the website interaction information as input to produce the module output, wherein the website interaction information is weighted with one or more weight vectors; and program code for assembling the computational module based on the specifying of the module input and the specifying of the function or the parameter, wherein the configuring and assembling are performed by a computer device.

* * * * *